US010612437B2

(12) United States Patent
Rusch et al.

(10) Patent No.: US 10,612,437 B2
(45) Date of Patent: Apr. 7, 2020

(54) METHOD FOR MOBILISING ASH IN AN EXHAUST-GAS PARTICLE FILTER

(71) Applicant: MTU FRIEDRICHSHAFEN GMBH, Friedrichshafen (DE)

(72) Inventors: Klaus Rusch, Achberg (DE); Raphael-David Leopold, Friedrichshafen (DE); Hilmar Wolman, Uhldingen-Mühlhofen (DE); Günter Zitzler, Opfenbach (DE); Alexander Schneider, Feldkirch (AT); Tim Späder, Langenargen (DE); Andrea Prospero, Langenargen (DE); Norbert Markert, Markdorf (DE); Michael Neuscheler, Friedrichshafen (DE); Viktor Mantaj, Friedrichshafen (DE); Michael Rauter, Kressbronn (DE); Boban Maletic, Friedrichshafen (DE); John Scholz, Friedrichshafen (DE); Daniel Chatterjee, Lindau (DE)

(73) Assignee: MTU FRIEDRICHSHAFEN GMBH, Friedrichshafen (DE)

( * ) Notice: Subject to any disclaimer, the term of this patent is extended or adjusted under 35 U.S.C. 154(b) by 135 days.

(21) Appl. No.: 15/737,129

(22) PCT Filed: Jun. 2, 2016

(86) PCT No.: PCT/EP2016/000903
§ 371 (c)(1),
(2) Date: Dec. 15, 2017

(87) PCT Pub. No.: WO2016/202430
PCT Pub. Date: Dec. 22, 2016

(65) Prior Publication Data
US 2018/0171844 A1 Jun. 21, 2018

(30) Foreign Application Priority Data

Jun. 16, 2015 (DE) .......................... 10 2015 007 722

(51) Int. Cl.
*F01N 3/02* (2006.01)
*F01N 9/00* (2006.01)
(Continued)

(52) U.S. Cl.
CPC ........... *F01N 3/0232* (2013.01); *F01N 9/002* (2013.01); *F01N 3/0222* (2013.01);
(Continued)

(58) Field of Classification Search
CPC ...... F01N 3/0222; F01N 3/0232; F01N 9/002; F01N 2900/1606; F01N 2900/1611; Y02T 10/47
(Continued)

(56) References Cited

U.S. PATENT DOCUMENTS 7,749,314 B2   7/2010   Kondou
8,919,106 B2   12/2014  Dittler
(Continued)

FOREIGN PATENT DOCUMENTS

DE   102013013063 A1   3/2014
DE   102013013096 A1   2/2015
(Continued)

*Primary Examiner* — Patrick D Maines
*Assistant Examiner* — Dapinder Singh
(74) *Attorney, Agent, or Firm* — Lucas & Mercanti, LLP; Klaus P. Stoffel

(57) ABSTRACT

A method for execution with an exhaust-gas particle filter which is operated with an exhaust-gas aftertreatment system, wherein the exhaust-gas particle filter has a filter wall along which exhaust gas is conducted for filtering purposes; wherein the method includes a regeneration phase with the steps: a) setting a soot load on the exhaust-gas particle filter, wherein the set soot load effects the formation of a soot layer on ash deposited on the filter wall; and b) subsequently mobilising the deposited ash by burning off the formed soot layer during the course of an active regeneration of the exhaust-gas particle filter.

10 Claims, 1 Drawing Sheet

(51) Int. Cl.
*F01N 3/023* (2006.01)
*F01N 3/022* (2006.01)

(52) U.S. Cl.
CPC ............ *F01N 2900/1606* (2013.01); *F01N 2900/1611* (2013.01); *Y02T 10/47* (2013.01)

(58) Field of Classification Search
USPC .............. 60/274, 277, 286, 295, 297, 311
See application file for complete search history.

(56) References Cited

U.S. PATENT DOCUMENTS

2014/0060008 A1\* 3/2014 Dittler ............... F01N 9/002
60/274
2015/0204224 A1 7/2015 Daido

FOREIGN PATENT DOCUMENTS

| | | |
|---|---|---|
| EP | 1832727 A2 | 9/2007 |
| WO | 2007000518 A2 | 1/2007 |
| WO | 2014038724 A1 | 3/2014 |
| WO | 2015033519 A1 | 3/2015 |

\* cited by examiner

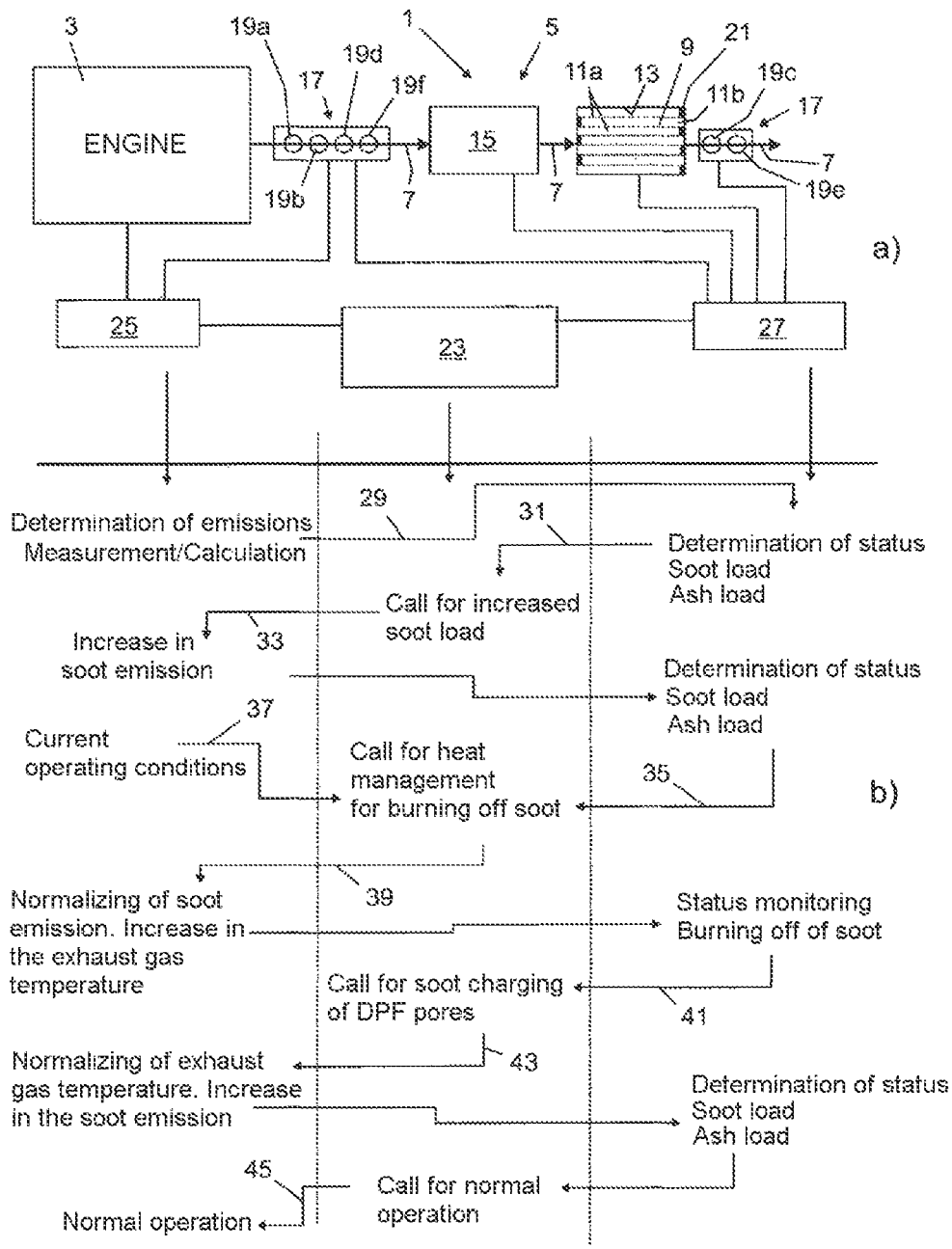

METHOD FOR MOBILISING ASH IN AN EXHAUST-GAS PARTICLE FILTER

The present application is a 371 of International application PCT/EP2016/000903, filed Jun. 2, 2016, which claims priority of DE 10 2015 007 722.8, filed Jun. 16, 2015, the priority of these applications is hereby claimed and these applications are incorporated herein by reference.

BACKGROUND OF THE INVENTION

The present invention relates to a method to be performed with an exhaust particulate filter.

In the prior art the publication DE 10 2013 013 063 A1 discloses a method for detaching ash that accumulates in operation from the channel walls in an exhaust particulate filter and transporting it to the end of each of the inlet channels of the exhaust particulate filter, in order to minimize the flow resistance, which over the operating time increases due to the ash. The method determines whether a limit for the quantity of soot is exceeded, requiring an ash detachment and transport process, and if the limit is exceeded a soot regeneration process is then started in order to expose the ash that is to be detached and transported. The exhaust gas flow rate is subsequently increased, in order to detach and transport the ash. This method is capable of improvement, however, particularly with regard to its efficiency.

SUMMARY OF THE INVENTION

Proceeding from this, the object of the present invention is to specify an improved method for ash treatment in an exhaust particulate filter.

According to the invention a method is proposed to be performed with an exhaust particulate filter, particularly in the course of operating the exhaust particulate filter with an exhaust gas aftertreatment system, preferably on an engine. In the context of the present invention the exhaust particulate filter is, in particular, a wall-flow filter, more particularly one of the type in which the exhaust particulate filter comprises inlet and outlet channels alternately closed at opposite ends, wherein the channels are separated by porous channel or filter walls.

An exhaust particulate filter provided as part of the invention or an exhaust gas aftertreatment system comprising the exhaust particulate filter is furthermore preferably provided in either case for an engine or an internal combustion engine of the diesel type (compression ignition engine) or a diesel internal combustion engine, particularly for a large engine. An exhaust particulate filter according to the present invention is thus preferably provided in the form of a (diesel) particulate filter (DPF).

An engine with which the exhaust particulate filter and the exhaust gas aftertreatment systems are preferably operated within the scope of the invention may be intended for a motor vehicle, for example, such as a ship, a locomotive or a commercial vehicle or also for fixed installation, for example a district combined heat and power station, an (emergency) power generator or also for industrial applications. Within the scope of the present invention the engine or the internal combustion engine may be additionally or alternatively intended for use with diesel fuel, for example also for use with heavy oil or bio oil.

According to the invention the exhaust particulate filter has a filter wall, along which exhaust gas for filtering (of particulates; in particular soot and ash) is led, preferably formed by the wall of at least one filter channel. In especially preferred embodiments the filter wall is a filter wall of an inlet channel, in particular of a wall-flow filter as discussed above. For the purposes of the invention the filter wall is preferably provided as a porous filter wall.

In a manner characteristic of the invention, and with the attendant advantage of improved ash treatment, the proposed method now comprises a (exhaust particulate filter) regeneration phase, in which in a first step a) a soot load on the exhaust particulate filter is set, wherein the set soot load gives rise to the formation of a layer of soot on top of ash deposited on the filter wall. In other words, in a first step of the regeneration phase according to the invention a layer of soot is to be—purposely or actively—accumulated on the ash which is deposited on the filter wall or channel wall during normal operation.

The setting of the soot load of the exhaust particulate filter in step a) is preferably brought about by briefly varying, in particular increasing the soot concentration in the exhaust gas in the course of operating the exhaust gas aftertreatment system with the exhaust particulate filter on an engine, in particular by briefly varying engine parameters, for example by varying the fuel injection quantity, fuel injection pressure, injection point, intake air mass, EGR rate or valve timings.

In a second step b) of the regeneration phase of the method according to the invention, the deposited ash is now mobilized by burning off the soot layer formed in the course of an active regeneration of the exhaust particulate filter. The term "active regeneration" is here to be interpreted in the conventional sense, that is to say the soot load is reduced in the course of the active regeneration through oxidation of the soot particles by means of oxygen, wherein the soot particles are converted, particularly into $CO_2$, in the particulate filter.

In other words, the method according to the invention, accompanied by an—at the time—active regeneration and preceding this, purposely applies a layer of soot to the deposited ash on the filter wall, that is to say in the course of a combined event or the regeneration phase according to the invention comprising steps a) and b).

This is accompanied by the decisive advantage of obtaining an improved mobilization of the ash during the active regeneration, as the inventor has surprisingly found. In the course of the mobilization, ash is detached from the filter wall and carried or transported away in the flow, the soot load previously set in step a) and the resulting layer of soot evidently ensuring that the now soot-coated ash is advantageously "entrained", that is to say mobilized, during the burn-off in step b). Subsequently, it is possible, particularly with a wall-flow exhaust particulate filter of the type previously discussed, to obtain a dense ash packing at the end of each (inlet) filter channel, and therefore to keep the increase in flow resistance low over the operating time. Inasmuch it was also recognized that exposing the ash prior to detachment and transport, as in the prior art, is more likely to be disadvantageous.

In the method according to the invention, step a) and step b) may be performed in immediate or direct succession, i.e. without interruption, as part of the regeneration phase according to the invention. It is also feasible, however, in the regeneration phase for the soot load set by step a) to be maintained at a predefined value for a period between step a) and step b). In this case it is possible through suitable heat management (relating to the exhaust particulate filter), for example, for a balance to be maintained between the soot charge and the soot burn-off over the period, that is to say until step b) is initiated. Such a method in which the soot load is maintained at a constant value over a phase or period can advantageously be performed where the aim is to await the onset of improved or optimum operating conditions for an active regeneration, especially with a view to flow conditions and also, in particular, for the densest possible ash packing.

The regeneration phase may be initiated in the course of the method, that is to say with step a), as soon as a threshold value that varies as a function of the load on the exhaust particulate filter is reached, (the ash/soot) load being determined by measurement and/or calculation, for example). Alternatively, it is also possible, for example, to provide for an initiation of the regeneration phase based on the elapsing of a predetermined period of time, for example operating time, before it is triggered. The active regeneration in step b) may commence if a predefined ash-soot ratio or a predefined quantity of soot is reached in the course of setting the soot charge (sooting-up) in step a).

A minimum necessary soot load for the intended ash mobilization by the method is preferably set, in order to minimize the average pressure loss via the exhaust particulate filter. The aim here, in particular, is to optimize the soot load so that on the one hand there is sufficient soot present before the active regeneration (for example in order, in the case of a wall-flow filter, to achieve the intended, dense ash packing), and on the other hand to keep the soot load low during the rest of the operating time (in order to minimize the pressure loss via the exhaust particulate filter).

A further intention with the proposed method is to set the soot charge in step a) taking into account those flow conditions in the exhaust particulate filter that are to be anticipated and/or set in step b) during the active regeneration in the exhaust particulate filter. In particular, since these flow conditions also have a direct influence on the movement of ash and since it could be observed with the invention—beyond what was previously known—that the quantity of soot required for detaching the ash from the filter or channel wall and the rate of flow during the active regeneration are interdependent, it is therefore possible in step a) to set the quantity of soot precisely as needed.

As part of a setting in step a) which takes account of the flow ratios according to step b), it is preferable to use values that are determined both over the entire exhaust particulate filter and also locally. For example, account is taken of the variable rate of flow in an axial direction and/or of the local soot concentration. In completing the regeneration phase according to the invention or also for initiating it, particular account may also be taken of the effective filter volume, which varies over the operating time of the exhaust particulate filter.

In a development of the proposed method, provision may advantageously be made for a third step c), which in particular immediately follows the active regeneration in step b). In step c) the soot load is here—briefly—increased in order to (re)apply a layer of soot to the filter wall. This can serve to ensure that the separation efficiency of the exhaust particulate filter (in terms of the number of particles) can be rapidly maximized after the active regeneration in step b), step c) preventing ash from being embedded in pores of the exhaust particulate filter, and clogging these up. A slight layer of soot can likewise hereby be applied under subsequent ash deposits, that is to say as a deliberate coating. This may make the ash subsequently even more easy to mobilize by the method according to the invention, for example in performing a repeated regeneration phase.

The invention also proposes an arrangement having an engine together with an exhaust gas aftertreatment system, comprising the exhaust particulate filter and assigned to the engine, wherein the arrangement is adapted to perform the method discussed above. For example, the arrangement may preferably be adapted to perform the method as apart of the interaction between an engine control module, an exhaust gas aftertreatment control module and an overriding control or monitoring unit, particularly in connection with a suitable sensor system of the exhaust gas aftertreatment system.

Further features and advantages of the invention emerge from the following description of exemplary embodiments of the invention, with reference to the figures in the drawings which show details essential for the invention, and from the claims. Individual features may each be embodied singly or severally in various combinations in a variant of the invention.

Preferred embodiments of the invention are explained in more detail below with reference to the drawings attached, of which:

BRIEF DESCRIPTION OF THE DRAWING

FIG. 1 schematically and by way of example in part
a) shows an arrangement for performing the method according to the invention and in part b) shows a flow chart of a possible embodiment of the method according to the invention in more detail by way of illustration.

DETAILED DESCRIPTION OF THE INVENTION

In the following description and the drawing the same reference numerals correspond to elements performing the same or a comparable function.

FIG. 1, part a) by way of example schematically shows an arrangement 1 comprising an engine 3, in particular a (large) diesel engine, and an exhaust gas treatment system 5, which is provided in order to treat exhaust gases from the engine 3, particularly in order to fulfil exhaust emission requirements regularly and reliably.

The exhaust gas aftertreatment system 5 comprises an exhaust tract 7, to the inlet side of which the exhaust gases from the engine 3 are fed and the outlet side of which opens into the surrounding environment, for example. An exhaust particulate filter 9, which is provided as a (diesel) particulate filter (DPF) of the exhaust gas aftertreatment system 5 is arranged in the exhaust tract 7 and inasmuch is open to a flow of exhaust gas through it. The exhaust particulate filter 9 is provided as a wall-flow filter or filter with a flow-permeable wall and is formed by a plurality of channels 11a,b, i.e. inlet channels 11a and outlet channels 11b extending parallel to one another.

The inlet channels 11a here each provide a filter wall 13 or channel wall, which is of pored or porous formation, and along which the exhaust gas is led for filtering. At the end the respective inlet channel 11a is closed in the exhaust gas direction of flow (the configuration and operating principle of such a filter can be inferred, for example, from the publication DE 10 2013, 013 063 A1, see in particular also FIG. 2, so that this will not be explored further here).

As FIG. 1 also illustrates, besides the exhaust particulate filter 9 the exhaust gas aftertreatment system 5 may comprise at least one further exhaust gas treatment stage 15, in particular a (diesel) oxidation catalytic converter (DOC), is arranged upstream of the exhaust particulate filter 9, for example. The function of an oxidation catalytic converter, for example, is to increase the exhaust gas temperature as necessary, for example for an active regeneration on the exhaust particulate filter 9, in which soot is burned off.

The exhaust gas aftertreatment system 5 may further comprise a sensor system 17 having at least one sensor 19a, b, c, . . . for registering measured variables relevant to the exhaust gas. The sensor system 17 may comprise a lambda probe 19a, for example, for measuring the oxygen content in the exhaust gas, and furthermore at least one temperature sensor 19b,c, for example, for registering the exhaust gas temperature, each preferably arranged upstream of the exhaust particulate filter 9, ref. numeral 19b, and downstream thereof, ref. numeral 19c, and furthermore at least one pressure sensor 19d,e, each preferably arranged upstream of the exhaust particulate filter 9, ref. numeral 19d and downstream thereof, ref. numeral 19e, the pressure sensors 19d,e serving to detect a pressure differential, for example, particularly as a basis for determining a current flow resistance on the DPF 9. The sensor system 17 may further comprise an NOx sensor 19f, for example. It is also feasible, however, to substitute model-based or computed values for one or more of the aforementioned, sensor-based measured variables.

Besides (diesel) soot, in operating the exhaust gas aftertreatment system 5 described, ash regularly occurs in the exhaust particulate filter 9, which accumulates on each filter wall 13 or channel wall, therefore increasing the loss in flow pressure due to clogging of the filter pores. In the absence of suitable counter-measures, therefore, the back pressure of the filter would rapidly increase. In order to counteract this, efforts known in the art are made to accumulate the ash at the end of the inlet channels 11a, that is to form a dense ash packing (ash plug) at the channel end 21. For this purpose the ash that has accumulated on the filter wall 13 must be detached and transported to the channel end 21.

A possible form of the method according to the invention is explored in more detail below with reference to FIG. 1, in particular with reference to part b), especially in connection with the arrangement 1 according to FIG. 1, part a).

For performing the method the arrangement 1 may preferably comprise an overriding control or monitoring unit 23, which controls the conduct of the method, preferably by means of an implemented, suitable program code. In addition the arrangement 1 preferably comprises an engine control module 25 and an exhaust gas aftertreatment (EGA) control module 27, which each interact with the overriding control 23 in order to perform the method. Both the engine control module 25 and the exhaust gas aftertreatment control module 27 may here have a suitable operative connection to the sensor system 17, and therefore to the engine 3 and the treatment stages 9, 15 in the exhaust gas after treatment system 5.

In anticipation of carrying out of the method, for example in normal operation, the sensor-assisted EGA control module 27—preferably incorporating exhaust emissions data 29 supplied by the engine control module 25—may continuously poll or determine the status of the exhaust particulate filter 9 with regard to its (ash/soot) load situation. As a result a status report 31 on this is sent to the overriding control 23 by the EGA control module 27. If the overriding control 23 detects on the basis of this that a predefined load threshold has been reached, which is determined by computation, for example, taking into account an effective filter volume, for instance, the overriding control 23 initiates the regeneration phase, according to the invention, of the exhaust particulate filter 9.

In a first step a) of the regeneration phase a soot load on the exhaust particulate filter 9 is first set, which causes a layer of soot to be formed on top of ash deposited on the filter wall 13, that is to say in the course of setting the soot load in step a), the soot concentration in the exhaust gas is increased, in particular for a brief period.

As FIG. 1, part b) shows, the overriding control 23 for this purpose instructs the engine control module 25 to increase the soot emissions, ref. numeral 33, which thereupon briefly adjusts the engine (operating) parameters. The parameters adjusted, for example, are the fuel injection quantity, a fuel injection pressure, an injection point, the intake air mass, the exhaust gas recirculation (EGR) rate or valve timings, so that the soot emission by the engine 3 and therefore the soot concentration in the exhaust gas increases.

If the overriding control 23 subsequently detects from the status report, ref. numeral 35, supplied by the EGA control module 27 or its status monitoring that the soot load (sooting-up), now increased according to step a) has reached a predefined target value, that is to say the proposed soot load has been set, the deposited ash is then mobilized according to the method in a step b), that is to say by burning off the formed layer of soot, in the course of an active generation of the exhaust particulate filter 9.

To initiate step b), current operating conditions, ref. numeral 37, preferably evaluated by the overriding control 23, particularly also with the aim of controlling the timing of the soot burn-off, in such a way that the densest possible ash packing can be obtained, for example due to advantageously high rates of flow. For this purpose the set soot load may be kept constant until a favorable triggering point for step b) is reached, for example as part of a suitable heat management as described in the introduction.

On detecting a suitable triggering point for step b), the overriding control 23, as part of the heat management, calls upon the engine control module 25 to reduce the soot emissions and to continue to increase the exhaust gas temperature for burning off the soot in the course of the active regeneration of the exhaust particulate filter 9 according to step b) (possibly incorporating the DOC), ref. numeral 39.

Step b) is terminated as soon as the overriding control unit 23 detects from the status monitoring, ref. numeral 41 by the EGA control module 27 that the soot has been burned off as intended, and therefore the ash accumulated on the filter wall 13 has been mobilized by burning off the soot and transported to the end 21 of the inlet channels 11a.

According to a preferred form of the method in step b)—subsequently now in a step c)—the overriding control 23 again calls for soot loading, ref. numeral 43, in the course of which the engine control module 25 normalizes the exhaust gas temperature, but in particular brings about the increase in soot emissions. With the soot load increased again, immediately following the active regeneration in step b), a thin layer of soot, that is to say a layer of predefined thickness, is advantageously accumulated on the now regenerated filter wall 13, which is capable of preventing subsequently charged ash from clogging the filter pores.

Once it is detected that a set value for this soot load has been reached, the overriding control then calls for normal operation, for example, ref. numeral 45, which can be set by the engine control module 25 on this basis.

The invention claimed is:

1. A method performed with an exhaust particulate filter operated with an exhaust gas aftertreatment system, wherein the exhaust particulate filter comprises a filter wall, along which exhaust gas is led for filtering, wherein the method comprises a regeneration phase having the steps of:
- a) setting of a predefined soot load on the exhaust particulate filter by increasing soot concentration in the exhaust gas, wherein the set soot load gives rise to formation of a layer of soot on top of ash deposited on the filter wall; and
- b) subsequent mobilization of the now soot-coated, deposited ash by burning off the formed layer of soot during an active regeneration of the exhaust particulate filter.

2. The method according to claim 1, wherein
step a) and step b) immediately follow one another during the regeneration phase; or
the set soot load is maintained at a predefined value over a period between step a) and step b).

3. The method according to claim 1, including
initiating the regeneration phase with step a), as soon as a threshold value that varies as a function of the load on the exhaust particulate filter is reached; and/or
when initiating the regeneration phase with step a) account is taken of an effective filter volume of the exhaust particulate filter.

4. The method according to claim 1, further comprising increasing the soot load in a step c), which immediately follow the active regeneration in b), in order to apply a layer of soot to filter wall.

5. The method according to claim 1, wherein
the active regeneration in step b) commences if a predefined ash-soot ratio or a predefined quantity of soot is reached by step a).

6. The method according to claim 1, wherein in setting the soot load in step a) account is taken of flow conditions which are to be anticipated or set on the exhaust particulate filter during the active regeneration in step b).

7. The method according to claim 1, wherein
a dense ash packing is obtained in the exhaust particulate filter by the displacement of ash in step b).

8. The method according to claim 1, including performing the method in connection with an engine and an exhaust gas aftertreatment system associated therewith, wherein the soot load is set in step a) by briefly varying engine parameters.

9. An arrangement, comprising: a motor; and an exhaust gas aftertreatment system, associated with the engine the exhaust gas aftertreatment system including an exhaust particulate filter, wherein the arrangement is adapted to perform the method according to claim 1.

10. The arrangement according to claim 9, wherein the arrangement is adapted to perform the method as part of an interaction between an engine control module, an exhaust gas aftertreatment control module and an overriding control.

* * * * *